United States Patent
Kim

(10) Patent No.: US 9,399,471 B2
(45) Date of Patent: Jul. 26, 2016

(54) APPARATUS FOR AUTOMATICALLY CONTROLLING VEHICLE SPEED AND METHOD OF USING THE SAME

(71) Applicant: Hyundai Motor Company, Seoul (KR)

(72) Inventor: Dae Sik Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/508,734

(22) Filed: Oct. 7, 2014

(65) Prior Publication Data

US 2015/0224990 A1 Aug. 13, 2015

(30) Foreign Application Priority Data

Feb. 11, 2014 (KR) ........................ 10-2014-0015199

(51) Int. Cl.
*B62D 12/00* (2006.01)
*B60Q 1/00* (2006.01)
(Continued)

(52) U.S. Cl.
CPC ......... *B60W 50/0097* (2013.01); *B60W 30/143* (2013.01); *B60W 50/14* (2013.01);
(Continued)

(58) Field of Classification Search
CPC ................... B60W 2550/20; B60W 2720/103; B60W 30/143; B60W 10/20; B60W 10/22; B60W 30/02; B60W 30/08; B60W 30/12; B60W 2720/106; B60W 50/14; B60W 2050/0071; B60W 2550/30; B60W 2720/10; B60W 30/18163; B60W 2550/143; B60R 16/0232; G01C 21/3469; G01F 9/023; H04Q 2209/25; H04Q 2209/40; H04Q 2209/886; H04Q 9/00; A61B 5/1103; A61B 5/14553

USPC ............ 701/9, 36, 41, 45, 66, 70, 78, 93, 96, 701/110, 117, 119, 30.8, 31.1, 32.3, 4, 24, 701/431, 301, 211; 340/439, 435, 438, 340/426.34, 436, 460, 575, 576, 573.7, 667, 340/7.58, 7.62; 180/68, 170, 268, 9.38

See application file for complete search history.

(56) References Cited

U.S. PATENT DOCUMENTS

2010/0198508 A1* 8/2010 Tang .................. G01C 21/3469
701/414
2012/0212353 A1* 8/2012 Fung ...................... B60K 28/06
340/905
2012/0218124 A1* 8/2012 Lee ...................... B60W 30/143
340/904

FOREIGN PATENT DOCUMENTS

JP 2007-246024 A 9/2007
KR 10-1998-027363 A 7/1998
(Continued)

OTHER PUBLICATIONS

J. Bengtsson, "Adaptive Cruise Control and Driver Modeling," Department of Automatic Control Lund Institute of Technology, Lund, Nov. 2001, pp. 1-93.

*Primary Examiner* — Muhammad Shafi
(74) *Attorney, Agent, or Firm* — McDermott Will & Emery LLP

(57) ABSTRACT

An apparatus for automatically controlling a vehicle speed includes a first unit configured to drive data of a vehicle from electric control units (ECUs) to determine driver's habits, a second unit configured to receive the drive data from the ECUs and receive a driver's habit value from the first unit to control a speed of a smart cruise control apparatus, a third unit configured to guide the driver visually or audibly by using information about a result of controlling the smart cruise control apparatus by the second unit, the drive data and driver's habit information, and a fourth unit configured to monitor the result of controlling the smart cruise control apparatus or drive data generated while the smart cruise control apparatus is operated to transmit the controlling result or the generated drive data to the first unit.

11 Claims, 7 Drawing Sheets

(51) Int. Cl.
  *B60W 50/00* (2006.01)
  *B60W 30/14* (2006.01)
  *B60W 50/14* (2012.01)
(52) U.S. Cl.
  CPC .. *B60W2050/0089* (2013.01); *B60W 2050/146* (2013.01); *B60W 2540/28* (2013.01); *B60W 2550/143* (2013.01); *B60W 2550/20* (2013.01); *B60W 2550/402* (2013.01); *B60W 2720/103* (2013.01); *Y02T 10/84* (2013.01)

(56) References Cited

FOREIGN PATENT DOCUMENTS

| | | |
|---|---|---|
| KR | 10-2005-0068938 A | 7/2005 |
| KR | 10-2012-0062538 A | 6/2012 |
| KR | 2012-0061683 A | 6/2012 |

\* cited by examiner

APPARATUS FOR AUTOMATICALLY CONTROLLING VEHICLE SPEED AND METHOD OF USING THE SAME

CROSS-REFERENCE TO RELATED APPLICATION

This application is based on and claims benefit of priority to Korean Patent Application No. 10-2014-0015199 filed on Feb. 11, 2014, the entire content of which is incorporated herein by reference.

TECHNICAL FIELD

The present inventive concept relates to an apparatus for automatically controlling a vehicle speed and a method of using the same. More particularly, it relates to an apparatus for automatically controlling a vehicle speed, such that fuel consumption can be reduced by controlling a smart cruise control apparatus based on road conditions and a variation of a vehicle driving state, and a method using the same.

BACKGROUND

The term "smart cruise control" refers to 'a cruise control apparatus' or an automatic speed control apparatus' which keeps a vehicle moving at a constant speed. When the smart cruise control is used, the driver can drive the vehicle at an economic speed within a speed limit without referring a speed meter.

However, in recent years, smart cruise control apparatuses, which automatically adjust the driving speed by sensing the distance from a vehicle ahead beyond the simple function of keeping a vehicle moving at a constant speed, are being developed.

However, an existing smart cruise control just controls the vehicle speed by sensing only the distance from a vehicle ahead, and an entrance into and exit from interchange (IC) or junction (JC).

In addition, when a vehicle travels on an uphill road, the existing smart cruise control allows the vehicle to increase the speed in order to maintain the constant speed, resulting in unnecessary and increased fuel consumption.

SUMMARY OF THE DISCLOSURE

Accordingly, the present inventive concept has been made in an effort to solve the above-mentioned problems, and it is an object of the present inventive concept to provide an apparatus for automatically controlling a vehicle speed by taking into consideration the combinations of a road condition, a vehicle driving condition, and a driver's habit, so that the fuel consumption may be minimized.

One aspect of the present inventive concept relates to an apparatus for automatically controlling a vehicle speed, the apparatus including a driver's habit determining unit, a speed control time point generation control unit, a display/audio control unit and a control result transmitting/monitoring unit. The driver's habit determining unit is configured to receive drive data of a vehicle from Electric Control Units (ECU) provided in the vehicle to determine driver's habits. The speed control time point generation control unit is configured to receive the drive data of the vehicle from the ECUs and a driver's habit value from the driver's habit determining unit to control a speed of a smart cruise control apparatus. The display/audio control unit is configured to guide the driver visually or audibly by using information about a result of controlling the smart cruise control apparatus by the speed control time point generation control unit, the drive data and driver's habit information. The control result transmitting/monitoring unit is configured to monitor the result of controlling the smart cruise control apparatus or drive data generated while the smart cruise control apparatus is operated in order to transmit the controlling result or the generated drive data to the driver's habit determining unit.

The driving propensity determination control unit may includes an input unit configured to receive the drive data from the ECUs, the controlling result from the control result transmitting/monitoring unit, and the drive data generated while the smart cruise control apparatus is operated, a rule database including a normalized table by removing an outlier from values received through the input unit, wherein the outlier is a value greater than a preset acceleration or deceleration value, a learning factor calculating part configured to calculate a learning factor from the rule database, a driver's habit calculating unit to calculate a driver's habit value by weighting a learning factor of a road type among learning factors calculated by the learning factor calculating part, wherein the weighted learning factor has a selection frequency value greater than a preset selection frequency value, a driver's habit database storing the driver's habit value calculated by the driver's habit calculating unit.

The learning factor calculating unit may be configured to extract a representative value from values stored in the rule database and apply an adaptive fuzzy logic to the representative value to calculate the learning factor.

The speed control time point generation control unit may include a vehicle monitoring unit configured to receive the drive data from the ECUs of the vehicle to produce valid drive data. A traveling route information generating unit configured to receive map data stored in the vehicle, and real time traffic information and road traffic message (RIM) information received from an outside to produce traveling route information including a cost of a predicted traveling route of the vehicle, a speed control profiling unit configured to receive the valid drive data from the vehicle monitoring unit and the driver's habit from the driver' habit determining unit to calculate speed control information, and a speed control value/time point determining unit configured to control the smart cruise control apparatus according to the speed control information calculated by the speed control profiling unit.

The vehicle monitoring unit may be configured to receive the drive data periodically transmitted from the ECUs of the vehicle, classify the drive data into acceleration/deceleration information, speed information, brake operation information, gear shift information, real-time fuel efficiency information, air-conditioner control information, or average fuel efficiency information, and remove an outlier from the classified information to produce the valid drive data, wherein the outlier is a value greater than a preset reference value.

The driving route information generating units may be configured to apply the road traffic message (RTM) information to the map data stored in the vehicle, and calculates a total energy consumption cost according to nodes and links in a predicted route of the vehicle based on the map data stored in the vehicle to produce driving route information.

The speed control profiling unit may be configured to apply the driver's habit value to the traveling route information received from the traveling route information generating unit in order to generate the traveling route information on which the driver's habit is reflected, and produce the speed control information including a value for controlling a speed of the smart cruise control apparatus according to the traveling route information on which the driver's habit is reflected.

The drive data may include acceleration/deceleration information, speed information, brake operation information, gear shift information, real-time fuel efficiency information, air-conditioner control information, or an average fuel efficiency information of the vehicle.

The information about the result of controlling the smart cruise control apparatus may include set speed information, ON/OFF information, operation change information and maintaining time information.

An energy minimizing position may be calculated by determining whether the predicted traveling route exists or not. When it is determined that the predicted traveling route exists, the cost of the predicted traveling route may be calculated according to the predicted traveling route. When it is determined that no predicted traveling route exists, the cost of the predicted traveling route may be calculated a link combination that minimizes the energy of link/sections in a radius.

Another aspect of the present inventive concept encompasses a method of automatically controlling a vehicle speed, including receiving drive data of a vehicle from Electric Control Units (ECUs) provided in the vehicle to store the drive data. A driver's habit of the vehicle is determined based on the drive data; applying the drive data and the driver's habit of the vehicle to control a speed of the vehicle. A speed control of the vehicle is monitored to store the speed control as the drive data.

In the determining of the driver's habit, an outlier may be removed from the drive data. The outlier may be a value greater than a preset acceleration or deceleration value; applying an adaptive fuzzy logic to the drive data from which the outlier is removed to calculate a learning factor. A learning factor of a road type among learning factors is weighed to determine the driver's habit, wherein the weighted learning factor has a selection frequency value greater than a preset selection frequency value.

In the applying of the drive data and the driver's habit, a speed control profile may be produced according to a predicted traveling route of the vehicle based on map data, drive data and a driver's habit value stored in the vehicle; and controlling a speed of the vehicle according to the speed control profile.

The drive data may include acceleration/deceleration information, speed information, brake operation information, gear shift information, real-time fuel efficiency information, air-conditioner control information, or average fuel efficiency information.

An energy minimizing position may be calculated by determining whether the predicted traveling route exists or not. When it is determined that the predicted traveling route exists, a cost of the predicted traveling route may be calculated according to the predicted traveling route. When it is determined that no predicted traveling route exists, the cost of the predicted traveling route may be calculated a link combination that minimizes the energy of link/sections in a radius.

The apparatus for automatically controlling vehicle speed and a method of using the same according to the present inventive concept may have the following effects.

Firstly, the energy consumption of a hybrid or electric vehicle can be minimized by controlling a vehicle speed with a smart cruise control apparatus in consideration of the real time variation of driving conditions and a driver's habit.

Secondly, the control result of the smart cruise control apparatus can be provided visually and audibly to a vehicle driver so that the drive can be assisted to economically drive the vehicle.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present inventive concept.

Figure 1:
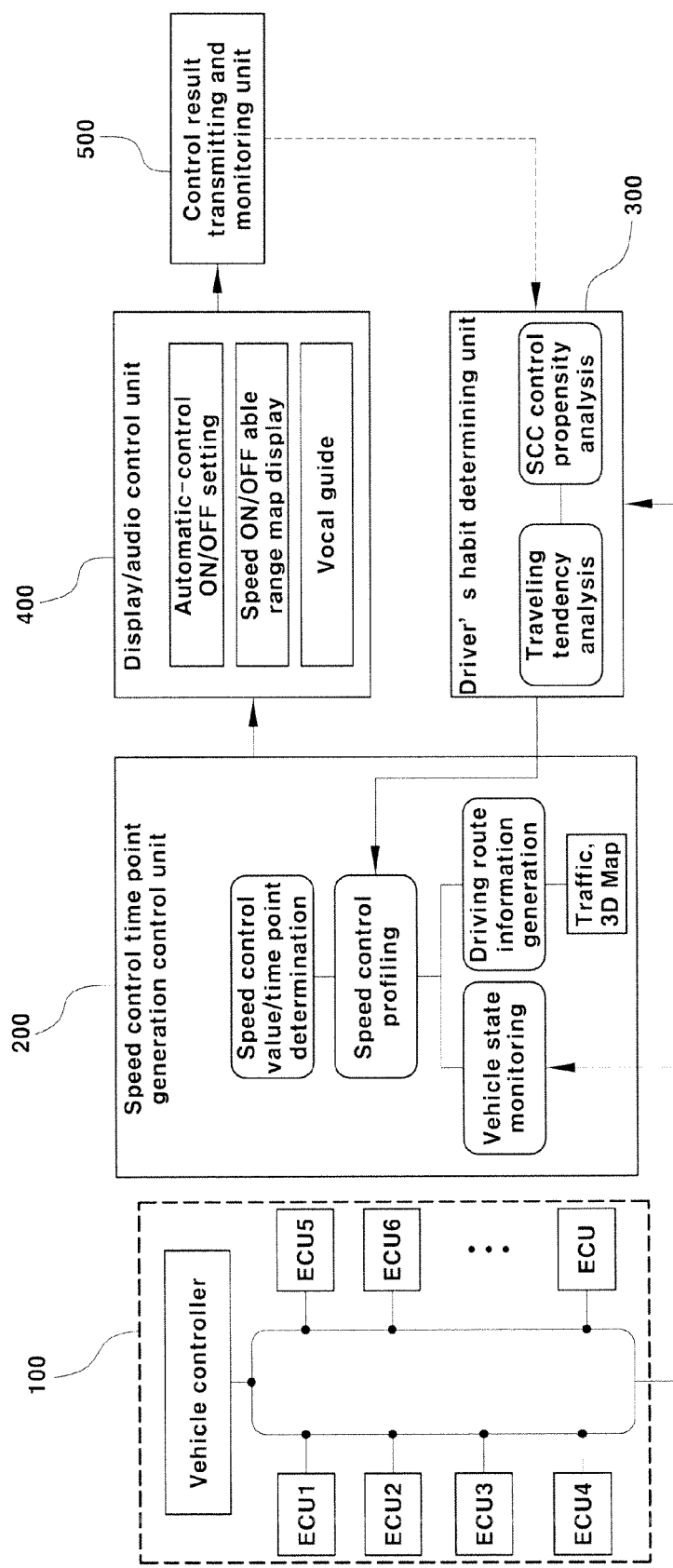
FIG. 1 is a schematic view showing an internal configuration of an apparatus for automatically controlling a vehicle speed according to an embodiment of the present inventive concept.

It should be understood that the appended drawings are not necessarily to scale, presenting a somewhat simplified representation of various preferred features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter, the present inventive concept will be described in detail with reference to accompanying drawings. The present inventive concept can be various modified and have various embodiments. Accordingly, specific embodiments are illustrated in drawings and will be described in detail. However, it should be understood to those skilled in the art that the present inventive concept is not limited to the specific embodiment, but includes all modifications, equivalents, and alternatives of the specific embodiment within the spirit and the technical scope of the present inventive concept.

FIG. 1 is a schematic view showing an internal configuration of an apparatus for automatically controlling a vehicle speed according to an embodiment of the present inventive concept.

The apparatus for automatically controlling a vehicle speed according to an embodiment of the present inventive concept may include an Electric Control Unit (ECU) 100, a speed control time point generation control unit 200, a driver's habit determining unit 300, a display/audio control unit 400, and a control result transmitting/monitoring unit 500.

The ECU 100 of the apparatus for automatically controlling a vehicle speed according to the embodiment, which is an assembly of various driving-related ECUs, may indicate an assembly of ECUs mounted on an accelerator, a battery, a brake, a smart control cruise apparatus, etc.

In addition, the speed control time point generation control unit 200 may process data about vehicle conditions by analyzing driving data transmitted from the ECU 100. The speed control time point generation control unit 200 may generate traveling route information based on map data, traffic information received from the outside, and information on fuel price. The speed control time point generation control unit 200 may apply a driver's habit to the travelling route information to generate speed control profiling. Further, the speed control time point generation control unit 200 may perform the speed control as well as the operation of turning on or off a smart cruise control apparatus by using the speed control profiling.

While a driver is directed along the travelling route through a navigation system, the display/audio control unit 400 according to an embodiment of the present inventive concept may provide a visual and audio guide about a zone on the map where the speed control is performed by the apparatus for automatically controlling a vehicle speed. In addition, the display/audio control unit 400 may output various kinds of input windows through a display such that the display/audio control unit 400 may receive an optional value.

The control result transmitting/monitoring unit 500 may transmit the result of controlling the vehicle speed by the apparatus for automatically controlling a vehicle speed, to the driver's habit determining unit 300. In addition, the control result transmitting/monitoring unit 500 may transmit the information about the values inputted through the display/audio control unit 400 by a user such that the information may be applied to the automatic vehicle control of the apparatus for automatically controlling a vehicle speed.

Figure 2:
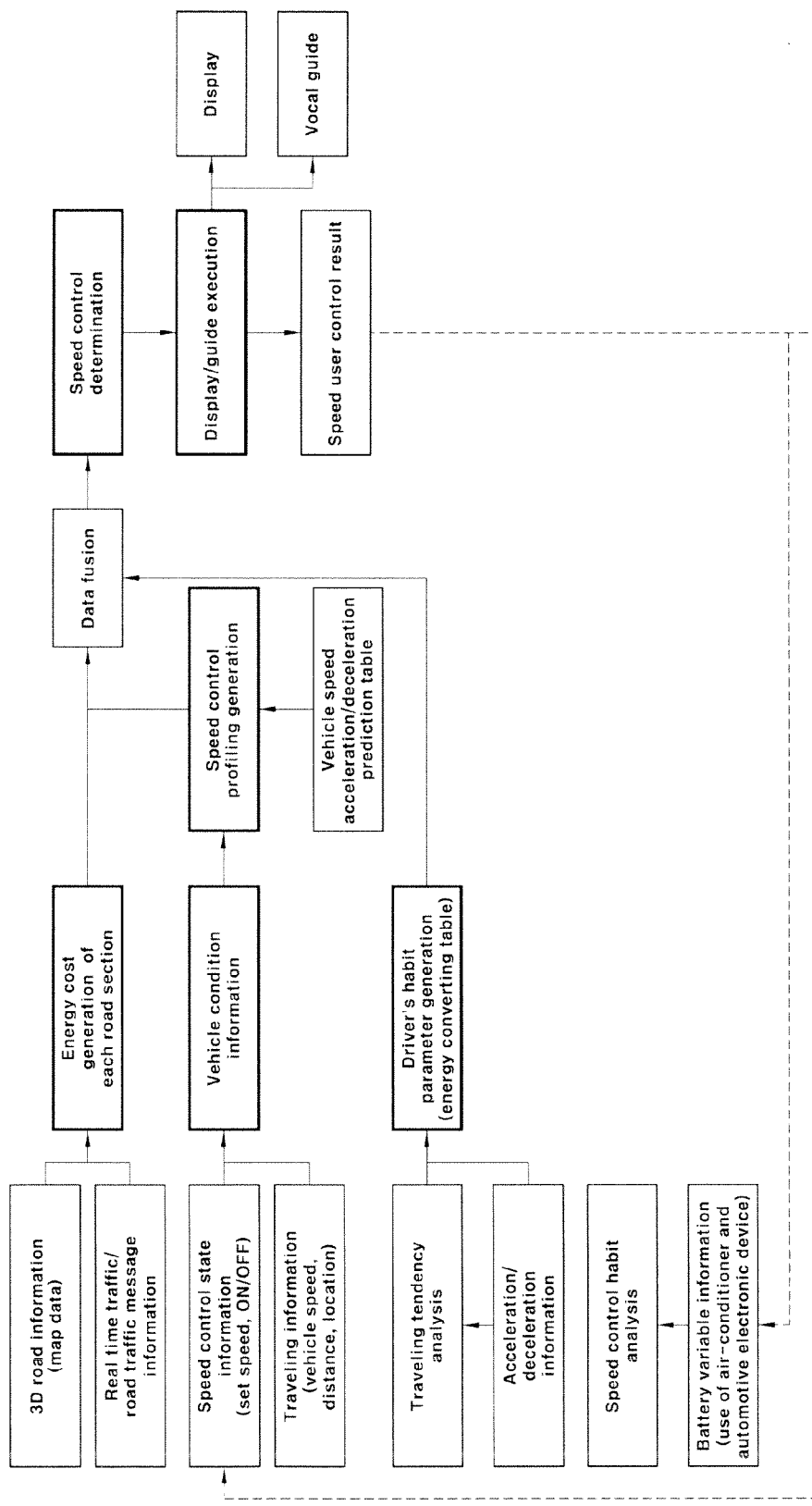
FIG. 2 is a flowchart illustrating an operation of an apparatus for automatically controlling a vehicle speed according to an embodiment of the present inventive concept.

FIG. 2 is a control block diagram illustrating the apparatus for automatically controlling a vehicle speed according to an embodiment of the present inventive concept.

First, a method of automatically controlling a vehicle speed according to an embodiment of the present inventive concept may calculate energy cost of each road section based on map data, and real time traffic information and road traffic message (RTM) information received from the outside. Such road sections may be classified according to types of roads such a national highway or an expressway. If a user selects a point of departure and a destination through a navigation system, the roads may be classified according to the choice of the user. However, the present inventive concept is not limited thereto, and may be applicable to all types of roads on which a vehicle may travel.

Then, the information about a vehicle condition may be produced based on the drive data collected from various kinds of ECUs. In this case, the drive data may include, for example, speed control state information, such as ON/OFF information of the smart cruise control apparatus or set speed information of the smart cruise control apparatus, vehicle speed and travelling distance information collected from the ECUs, or travelling information such as position information collected from a global positioning system (GPS). In addition, if any other information such as acceleration or deceleration information is collected from the ECUs installed in a vehicle, that information may be utilized to determine the conditions of the vehicle.

Further, a speed control profile may be used by the apparatus for automatically controlling a vehicle speed according to an embodiment of the present inventive concept, and may be created by using a vehicle speed acceleration/deceleration prediction table based on vehicle state information.

A driver's habit parameter of the method of automatically controlling a vehicle speed according to an embodiment of the present inventive concept may be calculated by analyzing the driver's habits based on the acceleration/deceleration information collected from the ECUs and synthesizing the speed control habit analyzing information calculated based on the information about a battery variation due to the use of various kinds of automotive electronic devices.

Based on the calculated energy costs of each road section, the speed control profile, and the driver's habit parameter value, the apparatus for automatically calculating a vehicle speed according to an embodiment of the present inventive concept may control the speed of the smart cruise control apparatus, display the speed control result through a display, and perform a vocal guide through a speaker.

Further, the smart cruise control apparatus of the apparatus for automatically controlling a vehicle speed may again monitor and store an ON/OFF tendency, the speed setting information, the number of operations or the maintaining time, and update the information about the state of the vehicle and driver's habit, so that the vehicle may be always controlled to be maintained at an optimal vehicle speed.

Figure 3:
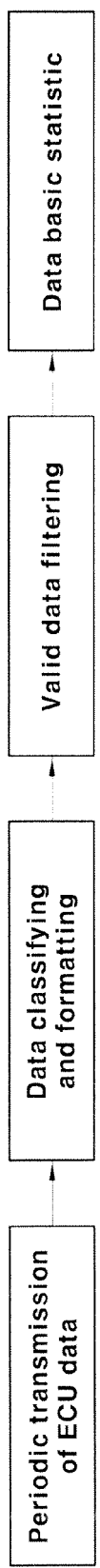
FIG. 3 is a sequential block diagram illustrating a process of collecting travelling data and converting the collected travelling data by the speed control time point generation control unit according to an embodiment of the present inventive concept.

FIG. 3 is a sequential block diagram illustrating a process of collecting travelling data and converting the collected travelling data by the speed control time point generation control unit 200 according to an embodiment of the present inventive concept.

The speed control time point generation control unit 200 may periodically receive data from the ECU 100 of the vehicle. The data may be classified into vehicle speed control information data, vehicle speed data, data about the operation or non-operation of the brake and gear shift data, and values greater than a preset reference value may be removed to extract effective data. The preset reference value, indicating an abnormal travelling value, may be determined as a statistically valueless value and may be arbitrarily determined according to a system design.

Figure 4:
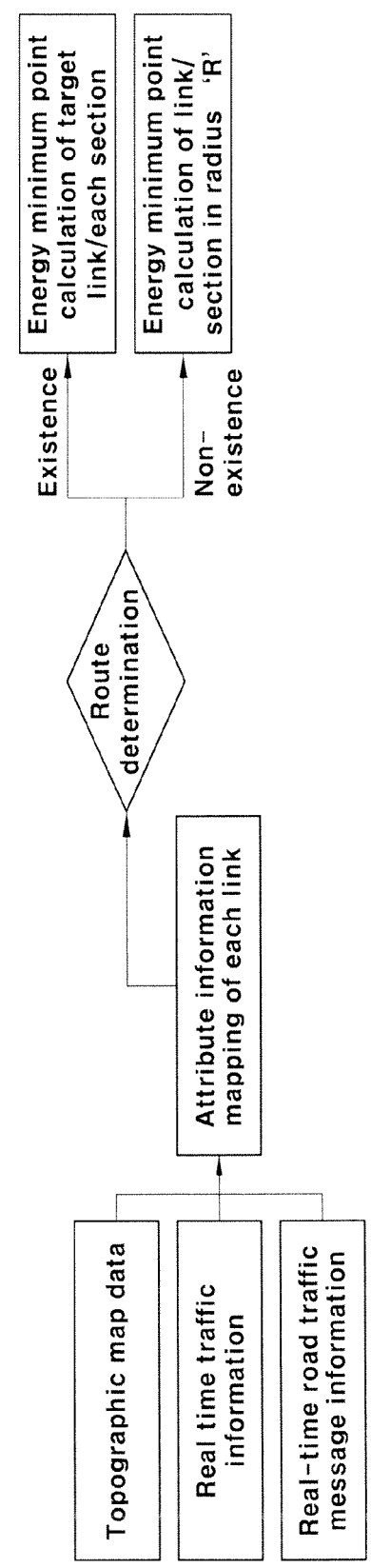
FIG. 4 is a view illustrating a process of analyzing map data and traffic data received from the speed control time point generation control unit according to an embodiment of the present inventive concept.

FIG. 4 is a block diagram illustrating a process of analyzing map and traffic data received from the speed control time point generation control unit 200 according to an embodiment of the present inventive concept.

The speed control time point generation control unit 200 according to an embodiment of the present inventive concept may receive topographic map data, real-time traffic information, real-time road traffic message information and may perform a process of mapping the received the topographic map data, the real-time traffic information, and the real-time road traffic message information.

In addition, the process of calculating the energy minimizing position may be performed according to whether a traveling route exists or not. In detail, when the traveling route exists, the cost may be calculated according to the traveling route. To the contrary, when no traveling route exists, the cost may be calculated according to a link combination that minimizes the energy of the link/sections in radius 'R'. The total cost may be calculated by summing up the link cost, the node cost and the additional cost.

Figure 5:
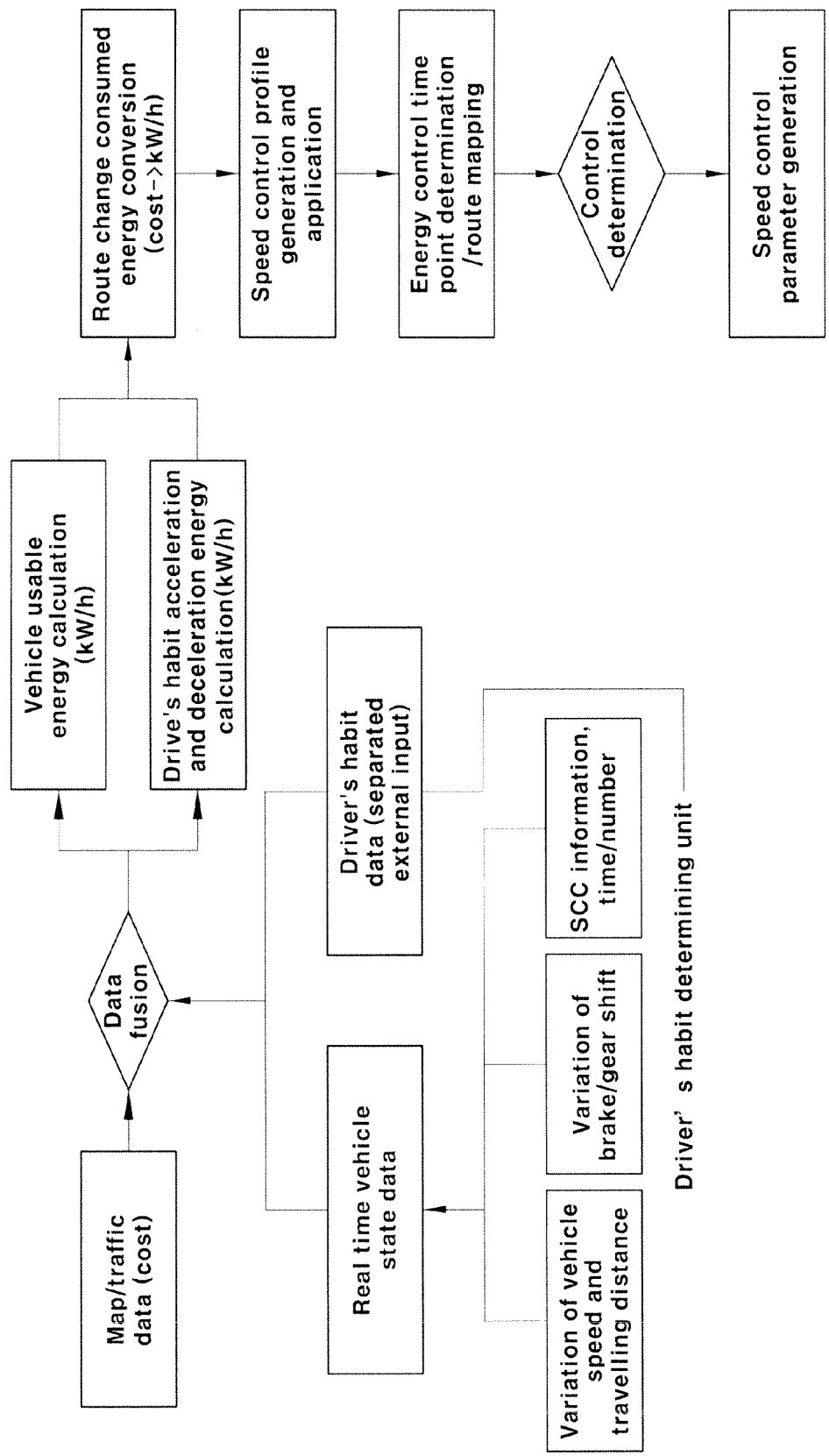
FIG. 5 is a view illustrating a process of determining a control value and a control time point of the smart cruise control apparatus by making fusion a speed control profile and data in the speed control time point generation control unit according to an embodiment of the present inventive concept.

FIG. 5 is a block diagram illustrating a process of determining a controlled value and a control time point of the smart cruise control apparatus by using a speed control profile and data fusion in the speed control time point generation control unit 200 according to an embodiment of the present inventive concept.

The speed control time point generation control unit 200 according to an embodiment of the present inventive concept may receive the driver's habit data from the driver's habit determining unit 300 and may perform data fusion on the driver's habit data and the cost value calculated by using the map or traffic data.

In addition, speed control time point generation control unit 200 may receive real-time state data of a vehicle based on the information about a vehicle speed, traveling distance and a gear shift, and the information about control, control time and the number of controls of the smart cruise control apparatus, and may perform data fusion on the received information and the data calculated by using the driver's habit data and the map and traffic data. This process may be performed through a normalization process.

Next, the speed control time point generation control unit 200 according to an embodiment of the present inventive concept may calculate usable energy such as a battery or gasoline of a vehicle and may calculate increased or decreased energy according to the driver's habit, so that the consumed energy (or energy consumption) may be calculated according to the traveling route.

The cost of energy consumed according to a route change may be calculated as a ratio (e.g., kW/h) according to the traveling distance, and a speed acceleration/deceleration variation profile may be created by using the consumed energy cost.

The ON/OFF time point and the acceleration/deceleration parameter of the speed control apparatus may be determined by mapping the acceleration/deceleration parameter profile with the route energy (e.g., energy consumed according to a route change).

Figure 6:
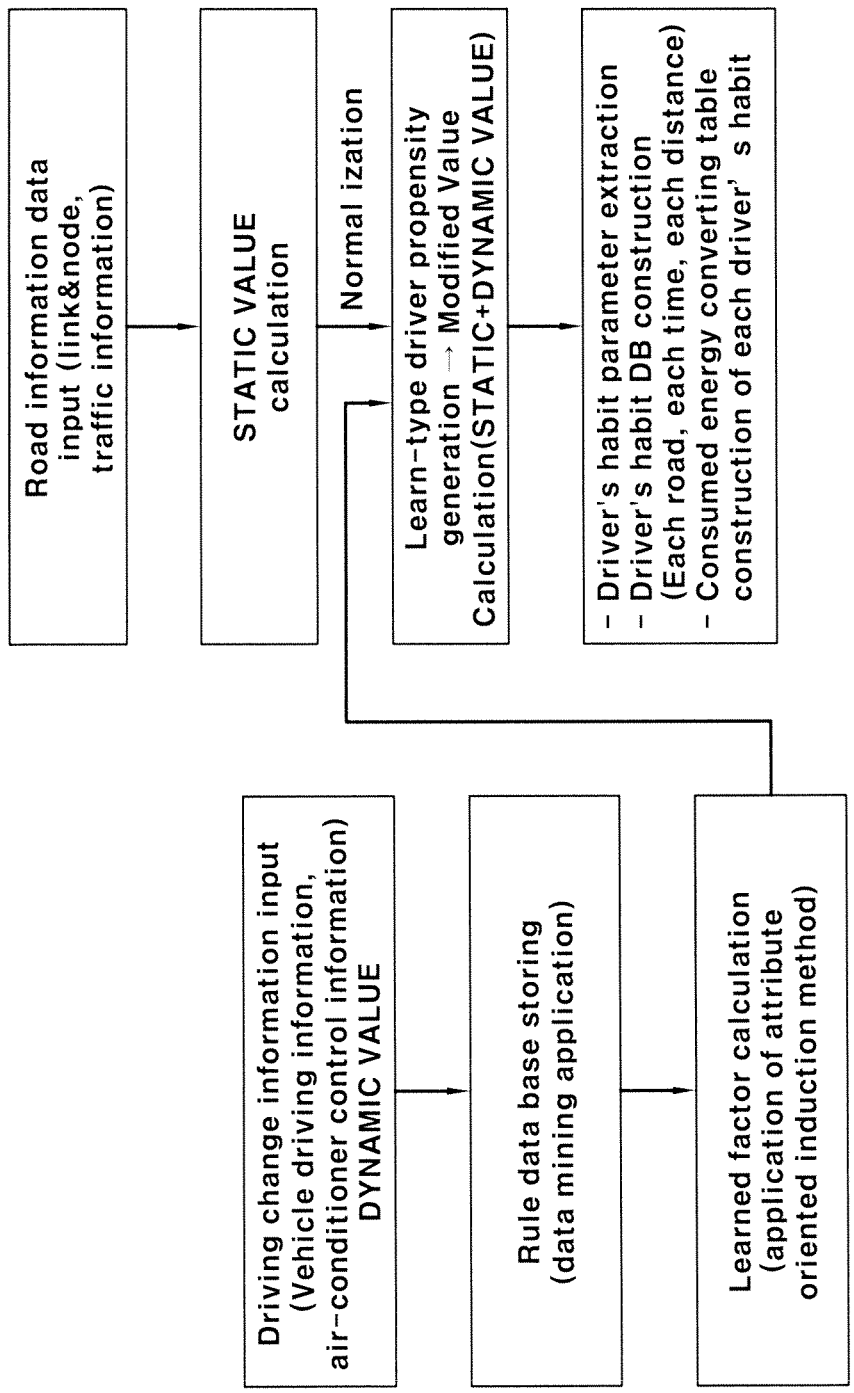
FIG. 6 is a block diagram illustrating a process of calculating a driver's habit value in a driver's habit determining unit according to an embodiment of the present inventive concept.

FIG. 6 is a block diagram illustrating a process of calculating driver's habit value in the driver's habit determining unit 300.

First, the the driver's habit determining unit 300 may receive information about the drive data of the vehicle and in this case, may perform a process of removing an outlier, e.g., a missing or incomplete value. That is, a process of configuring an attribute generalization table may be performed by converting the drive data into a rule set for learning. In addition, a scheme of removing the outlier, e.g., the missing or incomplete value may be performed by removing a preset acceleration value or a preset deceleration value from the received drive data.

Data mining may be applied to the attribute generalization table to allow the attribute generalization table to be stored in a rule database.

Then, the driver's habit determining unit 300 may extract information about repeated acceleration/decelerations and a representative value in a desired section in which the speed is maintained or varied to calculate a learning factor. The learning factor may be calculated by using adaptive fuzzy control logic according to an attribute oriented induction method.

Next, the driver's habit determining unit 300 may receive the road condition information data of the drive data and may perform a process of adding or deleting data thereto or therefrom at a data point that needs to change a learning guide, by using the normalized value and the learning factor.

In addition, a process of producing a frequently chosen road type as a final value corrected by applying a weight to the learning value.

Thereafter, the physical values may be classified with reference to a plurality of parameters to increase or decrease the physical values in accordance with the driver's habit and the parameters may be mapped by each of the accumulated road types, time and traveling distance, so that the process of arranging the parameters to freely combining the parameters may be performed. In this process, the normalization and the size control may be performed, the parameters may be extracted according to the driver's habit, and a table may be constructed such that, when the prediction of consumed energy is changed, unit energy consumption may be changed according to different driver's habits and different databases.

Figure 7:
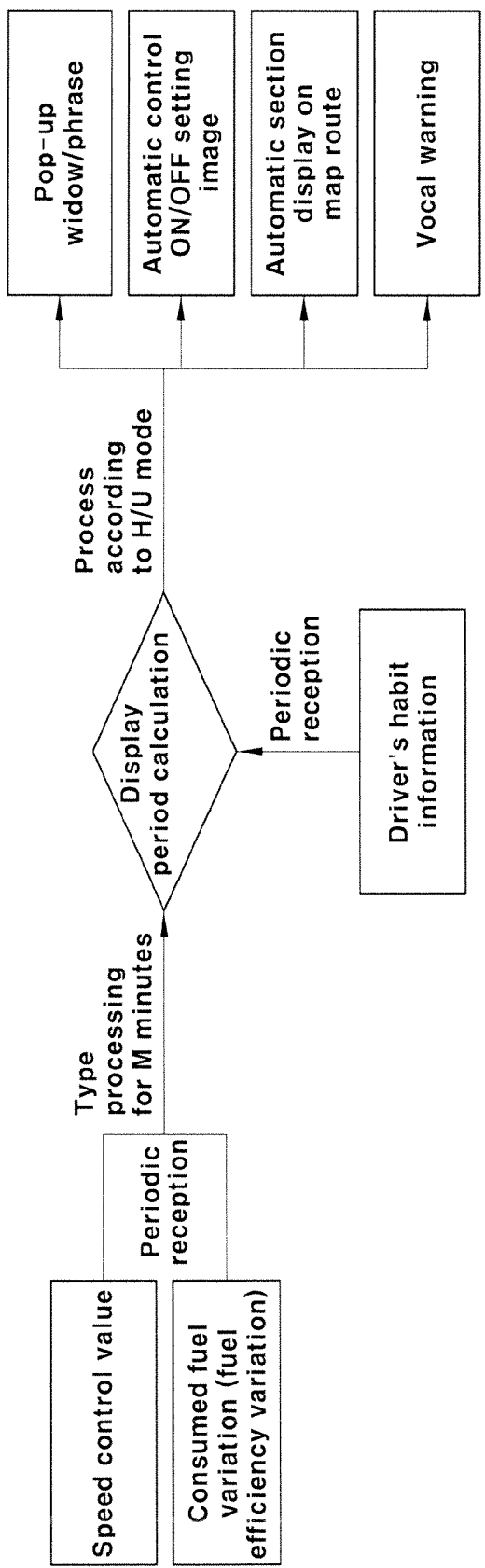
FIG. 7 is a block diagram illustrating operations of a display/audio control unit according to an embodiment of the present inventive concept.

FIG. 7 is a block diagram illustrating operations of the display/audio control unit 400.

The display/audio control unit 400 may periodically receive the speed controlled value and the quantity of consumed fuel, and further receive the information about driver's habit to provide information through the display. That is, the display/audio control unit 400 may periodically monitor the driving speed, the quantity of consumed fuel and the information about driver's habit and may provide the driving speed, the quantity of consumed fuel and the information about driver's habit through a popup widow, a text or a voice.

In addition, the automatic control section may be indicated on the map route, such that the start and end points, and the maintaining time of the control by the apparatus of automatically control a vehicle speed according to an embodiment of the present inventive concept may be indicated.

Further, a setting screen may be provided to receive information on whether to activate the apparatus of automatically control a vehicle speed or not.

Figure 8:
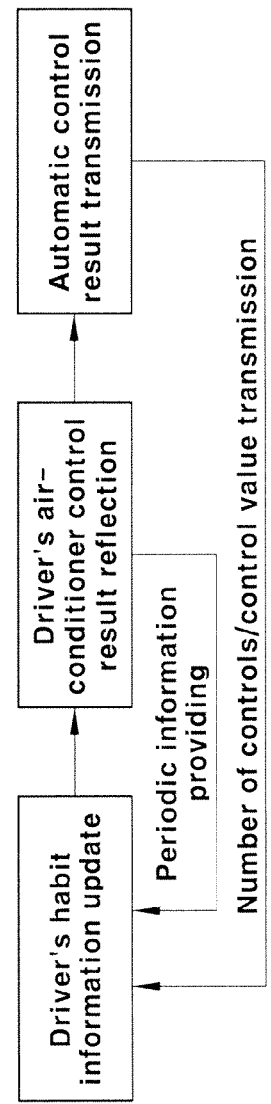
FIG. 8 is a block diagram illustrating operations of the control result transmitting/monitoring unit according to an embodiment of the present inventive concept.

FIG. 8 is a block diagram illustrating operations of the control result transmitting/monitoring unit 500.

The control result transmitting/monitoring unit 500 may allow a result of the automatic control to be again applied to the driver's habit information. In addition, an air conditioner control result by a driver may be periodically applied to the driver's habit information.

Therefore, the driver's habit information may be periodically updated and the updated driver's habit information may be again used to determine the speed variation, the ON/OFF or the maintaining time of the apparatus for automatically controlling a vehicle speed according to an embodiment of the present inventive concept.

Figure 9:
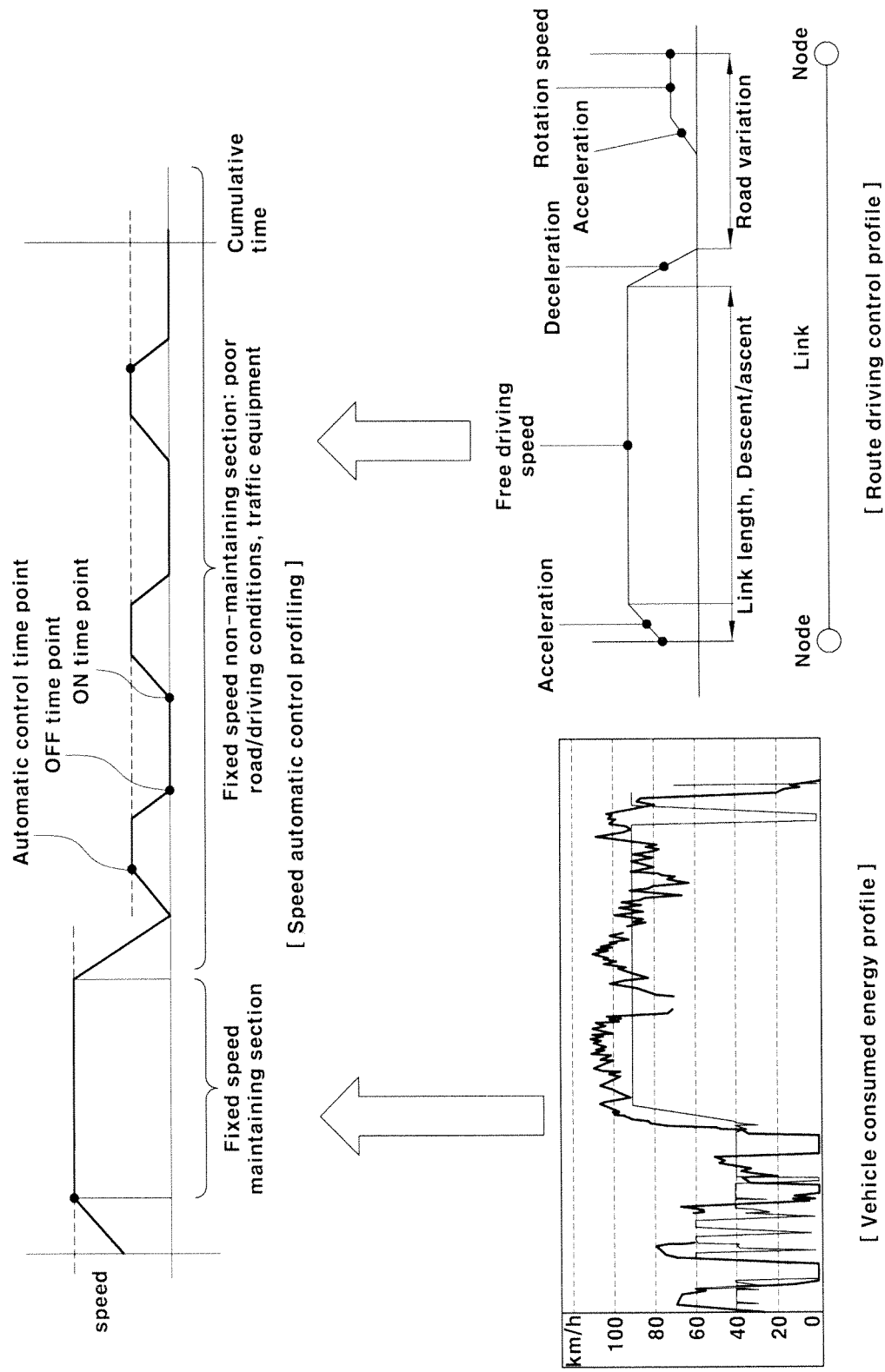
FIG. 9 is graphs illustrating a process of controlling a vehicle speed by an apparatus for automatically controlling a vehicle speed according to an embodiment of the present inventive concept.

FIG. 9 is graphs illustrating a process of controlling a speed by an apparatus for automatically controlling a vehicle speed according to an embodiment of the present inventive concept.

The apparatus for automatically controlling a vehicle speed according to an embodiment of the present inventive concept may produce the automatic speed control profiling by using the consumed energy profile of a vehicle and the traveling condition profile of a traveling route obtained through the above processes. The apparatus for automatically controlling a vehicle speed according to an embodiment of the present inventive concept may allow the constant speed maintaining section to be repeatedly turned on or off, so that the energy consumption of the vehicle may be minimized. That is, it is possible that the smart cruise control apparatus according to an embodiment of the present inventive concept is not controlled to maintain the constant speed even in a section in which the road or driving conditions is poor, but the ON/OFF operation or the maintaining time may be controlled to be suited to the corresponding section so that the speed control can be performed at the maximum efficiency.

Although the present inventive concept has been described in detail until now, the scope of the present inventive concept is not limited to the description but various modifications made by those skilled in the art using the basic concept of the present inventive concept defined by the claims also fall within the scope of the present inventive concept.

What is claimed is:

1. An apparatus for automatically controlling a vehicle speed, the apparatus comprising:
    a driver's habit determining unit configured to receive drive data of a vehicle from Electric Control Units (ECUs) provided in the vehicle to determine driver's habits;
    a speed control time point generation control unit configured to receive the drive data of the vehicle from the ECUs and receive a driver's habit value from the driver's habit determining unit to control a speed of a smart cruise control apparatus;
    a display/audio control unit configured to guide the driver visually or audibly by using information about a result of controlling the smart cruise control apparatus by the speed control time point generation control unit, the drive data and driver's habit information; and
    a control result transmitting/monitoring unit configured to monitor the result of controlling the smart cruise control apparatus or drive data generated while the smart cruise control apparatus is operated in order to transmit the controlling result or the generated drive data to the driver's habit determining unit,
    wherein the driver's habit determining unit includes:
    an input unit configured to receive the drive data from the ECUs;
    a rule database including a normalized table by removing an outlier from values received through the input unit, wherein the outlier is a value greater than a preset acceleration or deceleration value;
    a learning factor calculating part configured to calculate a learning factor from the rule database;
    a driver's habit calculating unit to calculate a driver's habit value by weighting a learning factor of a road type among learning factors calculated by the learning factor calculating part, wherein the weighted learning factor has a selection frequency value greater than a preset selection frequency value; and
    a driver's habit database storing the driver's habit value calculated by the driver's habit calculating unit.

2. The apparatus of claim 1, wherein the drive data from the ECUs includes:
    the controlling result from the control result transmitting/monitoring unit, and the drive data generated while the smart cruise control apparatus is operated.

3. The apparatus of claim 1, wherein the learning factor calculating unit is configured to extract a representative value from values stored in the rule database and apply an adaptive fuzzy logic to the representative value to calculate the learning factor.

4. The apparatus of claim 1, wherein the speed control time point generation control unit includes:
    a vehicle monitoring unit configured to receive the drive data from the ECUs of the vehicle to produce valid drive data;
    a traveling route information generating unit configured to receive map data stored in the vehicle, and real time traffic information and road traffic message (RTM) information received from an outside to produce traveling route information including a cost of a predicted traveling route of the vehicle;
    a speed control profiling unit configured to receive the valid drive data from the vehicle monitoring unit and the driver's habit from the driver' habit determining unit to calculate speed control information; and
    a speed control value/time point determining unit configured to control the smart cruise control apparatus according to the speed control information calculated by the speed control profiling unit.

5. The apparatus of claim 4, wherein the vehicle monitoring unit is configured to receive the drive data periodically transmitted from the ECUs of the vehicle, classify the drive data into acceleration/deceleration information, speed information, brake operation information, gear shift information, real-time fuel efficiency information, air-conditioner control information, or average fuel efficiency information, and remove an outlier from the classified information to produce the valid drive data, wherein the outlier is a value greater than a preset reference value.

6. The apparatus of claim 4, wherein the driving route information generating unit is configured to apply the road traffic message (RTM) information to the map data stored in the vehicle, and calculate a total energy consumption cost according to nodes and links in a predicted route of the vehicle based on the map data stored in the vehicle to produce driving route information.

7. The apparatus of claim 4, wherein the speed control profiling unit is configured to apply the driver's habit value to the traveling route information received from the traveling route information generating unit in order to generate the traveling route information on which the driver's habit is reflected, and produce the speed control information including a value for controlling a speed of the smart cruise control apparatus according to the traveling route information on which the driver's habit is reflected.

8. The apparatus of claim 4, wherein an energy minimizing position is calculated by determining whether the predicted traveling route exists or not.

9. The apparatus of claim 8, wherein:
    when it is determined that the predicted traveling route exists, the cost of the predicted traveling route is calculated according to the predicted traveling route, and
    when it is determined that no predicted traveling route exists, the cost of the predicted traveling route is calculated a link combination that minimizes the energy of link/sections in a radius.

10. The apparatus of claim 1, wherein the drive data includes acceleration/deceleration information, speed information, brake operation information, gear shift information, real-time fuel efficiency information, air-conditioner control information, or an average fuel efficiency information of the vehicle.

11. The apparatus of claim 1, wherein the information about the result of controlling the smart cruise control apparatus includes set speed information, ON/OFF information, operation change information and maintaining time information.

* * * * *